United States Patent
Yoshizawa et al.

(10) Patent No.: US 10,491,493 B2
(45) Date of Patent: Nov. 26, 2019

(54) NETWORK SYSTEM, CONTROL METHOD OF A NETWORK SYSTEM, AND TERMINAL

(71) Applicant: Seiko Epson Corporation, Tokyo (JP)

(72) Inventors: Junichi Yoshizawa, Matsumoto (JP); Koichiro Tsutsumi, London (GB)

(73) Assignee: SEIKO EPSON CORPORATION, Tokyo (JP)

( * ) Notice: Subject to any disclaimer, the term of this patent is extended or adjusted under 35 U.S.C. 154(b) by 177 days.

(21) Appl. No.: 15/158,836

(22) Filed: May 19, 2016

(65) Prior Publication Data
US 2016/0366210 A1 Dec. 15, 2016

(30) Foreign Application Priority Data

Jun. 10, 2015 (JP) .................................. 2015-117240

(51) Int. Cl.
| H04L 12/26 | (2006.01) |
|---|---|
| G06Q 20/20 | (2012.01) |
| H04L 12/12 | (2006.01) |
| H04L 29/08 | (2006.01) |

(52) U.S. Cl.
CPC ........ *H04L 43/0811* (2013.01); *G06Q 20/202* (2013.01); *H04L 12/12* (2013.01); *H04L 67/1095* (2013.01)

(58) Field of Classification Search
None
See application file for complete search history.

(56) References Cited

U.S. PATENT DOCUMENTS

| 9,641,713 | B2* | 5/2017 | Ohshima | H04N 1/00891 |
|---|---|---|---|---|
| 10,237,348 | B2* | 3/2019 | Tsutsumi | H04L 67/1097 |
| 2003/0191709 | A1* | 10/2003 | Elston | G06Q 20/04 |
| | | | | 705/40 |
| 2006/0112287 | A1* | 5/2006 | Paljug | G06F 1/3209 |
| | | | | 713/300 |
| 2009/0310607 | A1* | 12/2009 | Evans | H04L 12/12 |
| | | | | 370/389 |
| 2013/0268745 | A1 | 10/2013 | Uehata | |
| 2014/0040120 | A1* | 2/2014 | Cho | G06Q 20/3278 |
| | | | | 705/39 |
| 2014/0189057 | A1* | 7/2014 | Sankoda | H04L 67/10 |
| | | | | 709/217 |
| 2014/0250311 | A1* | 9/2014 | Kubota | G06F 1/266 |
| | | | | 713/310 |
| 2015/0206116 | A1* | 7/2015 | Bess | G06Q 20/202 |
| | | | | 705/21 |

FOREIGN PATENT DOCUMENTS

| JP | 2004-221867 A | 8/2004 |
|---|---|---|
| JP | 2013-137666 A | 7/2013 |
| JP | 2013-218400 A | 10/2013 |

* cited by examiner

*Primary Examiner* — Thomas J Dailey
(74) *Attorney, Agent, or Firm* — Foley & Lardner LLP

(57) ABSTRACT

When able to communicate with a control server 15, the tablet terminal 13 of a transaction processing system 1 communicates with the control server 15 and executes a process using server-side data stored by the control server 15. When unable to communicate with the control server 15, the tablet terminal 13 communicates with a recording control device 16, and executes a process using control device-side data stored by the recording control device 16. If the recording control device 16 is not on, the tablet terminal 13 sends to the recording control device 16 a start command causing the recording control device 16 to start.

19 Claims, 9 Drawing Sheets

NETWORK SYSTEM, CONTROL METHOD OF A NETWORK SYSTEM, AND TERMINAL

Priority is claimed under 35 U.S.C. § 119 to Japanese Application no. 2015-117240 filed on Jun. 10, 2015 which is hereby incorporated by reference in their entirety.

BACKGROUND

1. Technical Field

The present disclosure relates to a network system, a control method of a network system, and a terminal.

2. Related Art

Technology enabling a control device to execute processes using data stored on a server in a system having a server (host computer) connected to a terminal are known from the literature. See, for example, JP-A-H10-247181.

In a system such as described in JP-A-H10-247181 in which a terminal and a server communicate through a network, and the terminal executes processes using data stored on the server, the terminal and server may not be able to communicate with each other at times, there is a need to execute a process for handling such events.

SUMMARY

A system according to the disclosure in which a terminal and a server communicate through a network, and the terminal executes processes using data stored on the server, can execute a process for handling events in which the terminal and server cannot communicate with each other.

A network system according to the disclosure includes a server that connects to a global network; a terminal configured to communicate with the server through the global network; and a control device configured to communicate with the terminal through a local area network. The terminal communicates with the server and executes a process using server-side data stored by the server when able to communicate with the server; communicates with the control device and executes a process using control device-side data stored by the control device when unable to communicate with the server; and sends a start command to the control device causing the control device to start when the control device is not on.

Thus comprised, a process for handling events in which the terminal and server cannot communicate with each other can be executed in a system in which a terminal and a server communicate through a network, and the terminal executes processes using data stored on the server.

In a network system according to another aspect of the disclosure, the terminal intermittently sends a response request command to the control device, determines if the control device is on based on the result of a response to the response request command, and sends the start command to the control device if the control device is not on.

After appropriately determining whether or not the control device has started, the terminal can cause the control device to start if the control device is not on.

In a network system according to another aspect of the disclosure, the control device intermittently sends to the server through the global network a change request command asking if there was a change in the server-side data stored by the server, and based on the response to the change request command, executes a process to synchronize the control device-side data stored by the control device with the server-side data stored by the server.

Thus comprised, because the control device-side data and the server-side data can be synchronized, the terminal can execute processes appropriately to whether the terminal is connected to the server or the control device.

In a network system according to another aspect of the disclosure, when the change request command is not received from the control device for a specific time or more, the server communicates with the terminal and causes the terminal to send a start command to the control device.

Thus comprised, the server can detect when the control device is not on based on whether or not a change request command from the control device is received at the specific interval, and based thereon can cause the terminal to start the control device.

In a network system according to another aspect of the disclosure, the terminal is connected to a recording device having a function to record on a recording medium, and causes the recording device to record on the recording medium using the server-side data or the control device-side data.

Thus comprised, a system in which a terminal and a server communicate through a network, and the terminal executes a process causing the recording device to record data stored by the server, can execute a process for handling situations in which the terminal is unable to communicate with the server.

In a network system according to another aspect of the disclosure, the terminal has a function of recording on a recording medium, and records on the recording medium using the server-side data or the control device-side data.

Thus comprised, a system in which a terminal and a server communicate through a network, and the terminal executes a process related to recording on a recording medium using data stored on the server, can execute a process for handling situations in which the terminal is unable to communicate with the server.

Another aspect of the disclosure is a control method of a network system including a server that connects to a global network, a terminal configured to communicate with the server through a global network, and a control device configured to communicate with the terminal through a local area network, the control method comprising steps of: the terminal communicating with the server and executing a process using server-side data stored by the server when able to communicate with the server, communicating with the control device and executing a process using control device-side data stored by the control device when unable to communicate with the server, and sending a start command to the control device causing the control device to start when the control device is not on.

Thus comprised, a process for handling events in which the terminal and server cannot communicate with each other can be executed in a system in which a terminal and a server communicate through a network, and the terminal executes processes using data stored on the server.

Another aspect of the disclosure is a terminal configured to communicate with a server through a global network and communicate with a control device through a local area network, the terminal: communicating with the server and executing a process using server-side data stored by the server when able to communicate with the server; communicating with the control device and executing a process using control device-side data stored by the control device when unable to communicate with the server; and sending a start command to the control device causing the control device to start when the control device is not on.

Thus comprised, a process for handling events in which the terminal and server cannot communicate with each other can be executed in a system in which a terminal and a server communicate through a network, and the terminal executes processes using data stored on the server.

Other objects and attainments together with a fuller understanding of the disclosure will become apparent and appreciated by referring to the following description and claims taken in conjunction with the accompanying drawings.

DESCRIPTION OF EMBODIMENTS

A preferred embodiment of the present disclosure is described below with reference to the accompanying figures.

Figure 1:
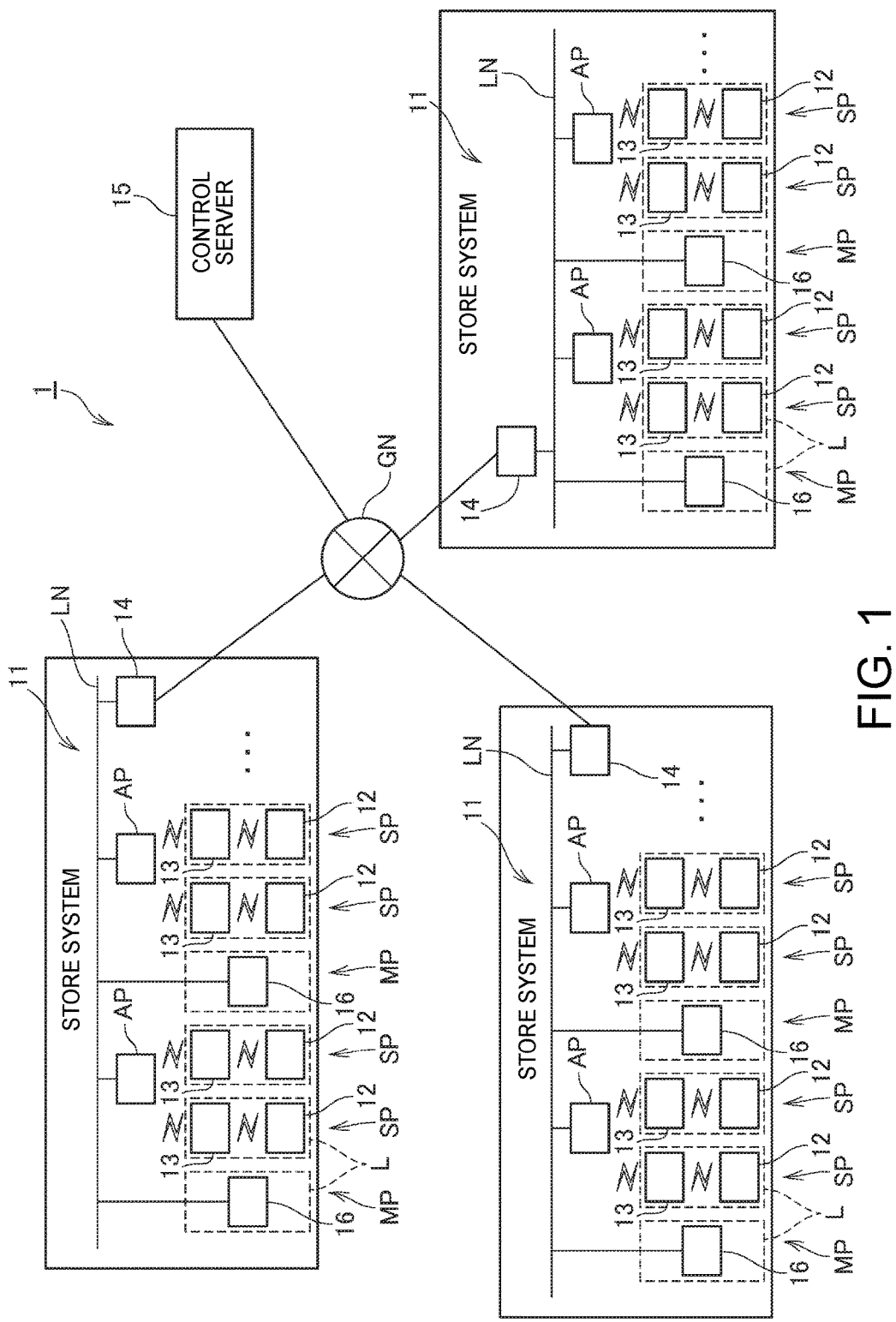
FIG. 1 illustrates the configuration of a transaction processing system according to the disclosure.

FIG. 1 illustrates the configuration of a transaction processing system 1 according to this embodiment of the disclosure.

As shown in FIG. 1, the transaction processing system 1 includes multiple store systems 11. A store system 11 is a system installed in an individual store such as a supermarket, convenience store, department store, or restaurant. A store system 11 has a function for processing transactions based on products purchased by a customer, and a function for producing transaction receipts.

A checkout counter L where customer transactions are processed is located in the business where the store system 11 is deployed. A main POS terminal MP that can produce receipts appropriate to the transaction, or a satellite POS terminal SP, is installed at each checkout counter L.

The main POS terminal MP has a recording control device 16 (control device). The recording control device 16 has functions for executing a transaction process appropriate to the transaction performed at the checkout counter L, and producing receipts recorded with information related to the transaction. Under specific circumstances such as described below, the main POS terminal MP functions as a server of which the tablet terminal 13 (described below) is a client.

The configuration and functions of the recording control device 16, and processes based on the functions of the recording control device 16, are described further below.

The satellite POS terminal SP includes a recording device 12 and a tablet terminal 13 (terminal) that connects and communicates wirelessly with the recording device 12.

The tablet terminal 13 is a tablet computer with a touch panel 32 (FIG. 3) on the front.

During a transaction at the checkout counter L, the tablet terminal 13 provides a specific user interface to the checkout clerk. The checkout clerk inputs according to the transaction to the user interface, and references information related to the transaction that is displayed on the user interface. The tablet terminal 13 controls the recording device 12 according to the transaction at the checkout counter L, and produces a receipt. The receipt produced by the recording device 12 is then given to the customer.

The configuration and functions of the satellite POS terminal SP, and processes based on the functions of the satellite POS terminal SP, are described further below.

The store system 11 also has a local area network LN.

The recording control device 16 of the main POS terminal MP connects by wire to the local area network LN according to a communication protocol appropriate to a wired LAN.

The tablet terminal 13 of the satellite POS terminal SP connects to the local area network LN according to a specific communication protocol for a wireless LAN. As described below, one or more access points P are also connected to the local area network LN. The tablet terminal 13 accesses the local area network LN by communicating wirelessly with an access point P according to a specific communication protocol for a wireless LAN.

A communication device 14 is also connected to the local area network LN. The communication device 14 is an interface device that connects the local area network LN to a global network GN (network) such as the Internet. The communication device 14 has the functions of a modem (or ONU (Optical Network Unit)), a router, a DHCP (Dynamic Host Configuration Protocol) server, and a NAT (Network Address Translation) unit. The communication device 14 passes data between devices when a device connected to the local area network LN and a device connected to the global network GN communicate with each other. Note that the communication device 14 is represented by a single function block in FIG. 1, but the communication device 14 may comprise plural devices with different functions.

The recording control device 16 and tablet terminal 13 can also access the global network GN through the communication device 14.

A control server 15 (server) connects to the global network GN. The control server 15 is a cloud server in a cloud system in which the recording control device 16 and tablet terminal 13 are clients. More specifically, when triggered by a request from a client device, for example, the control server 15 runs a specific operating process and sends data based on the result of the process to the client. Note that the control server 15 is represented by a single function block in FIG. 1, but this does not mean that the control server 15 is embodied by a single server device. For example, the control server 15 may include a plurality of server devices. More specifically, the control server 15 may be any configuration that can execute the processes described below.

Figure 2:
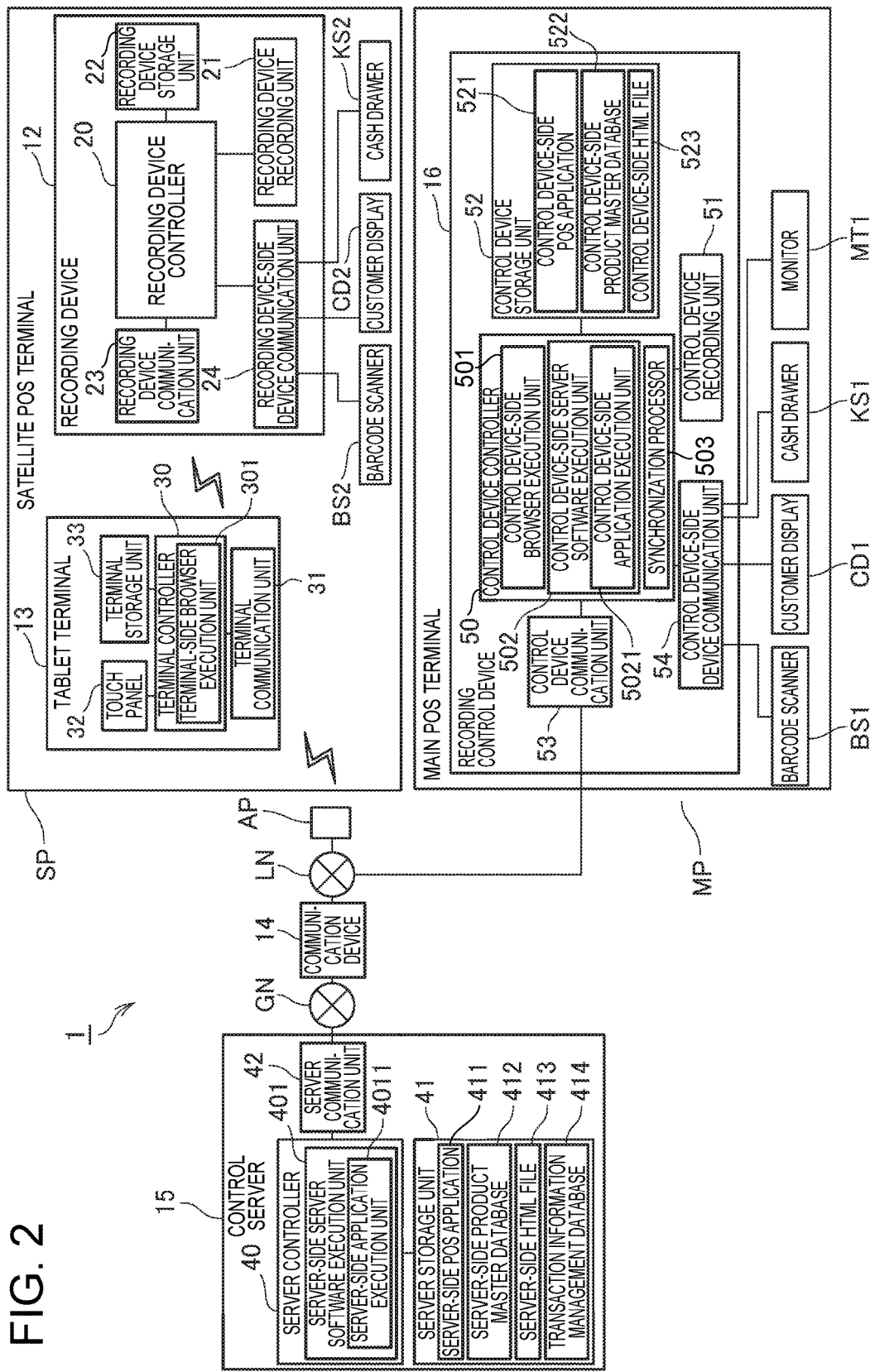
FIG. 2 is a block diagram illustrating the functional configuration of devices in the transaction processing system.

FIG. 2 is a block diagram illustrating the functional configuration of the recording control device 16, recording device 12, tablet terminal 13, and control server 15 in the transaction processing system 1.

The recording control device 16 is a thermal line printer that stores roll paper (recording medium) and records images by forming dots with a thermal line head on the roll paper.

In specific circumstances as described below, the recording control device 16 functions as a server of which the tablet terminal 13 is a client instead of the communication device 15, and executes processes in response to requests from the tablet terminal 13.

As shown in FIG. 2, the recording control device 16 has a control device controller 20 (control unit), a print unit 21, a control device storage unit 22, a control device communication unit 23 (communication unit), and a control device-side device communication unit 24.

As shown in FIG. 2, the recording control device 16 has a control device controller 50, a control device recording unit 51, a control device storage unit 52, a control device communication unit 53, and a control device-side device communication unit 54.

The control device controller 50 has a CPU, ROM, RAM, and other peripheral circuits not shown, and controls the recording control device 16.

A specific web browser is installed on the recording control device 16. The control device controller 50 functions as a control device-side browser execution unit 501 by reading and running the installed web browser.

Specific web server software is also installed on the recording control device 16. The control device controller 50 also functions as a control device-side server software execution unit 502 by reading and running the installed web server software.

A control device-side POS application 521, which is a web application that runs under the web server software, is also installed on the recording control device 16. The control device-side server software execution unit 502 functions as a control device-side application execution unit 5021 by reading and running the control device-side POS application 521.

A program with a function for synchronizing specific data stored by the communication device 15 and specific data stored by the recording control device 16 is also installed on the recording control device 16. The control device controller 50 functions as a synchronization processor 503 by reading and running the program.

The configuration and functions of the control device controller 50, and processes based on the functions of the control device controller 50, are described further below.

The control device recording unit 51 includes mechanisms related to recording on roll paper, such as a conveyance mechanism for conveying roll paper stored inside the cabinet of the recording control device 16, a recording mechanism for forming dots and recording images on the roll paper with a thermal head, and a cutter mechanism for cutting the roll paper at a specific position. The control device recording unit 51 conveys the roll paper with the conveyance mechanism, records receipt-related images on the roll paper with the recording mechanism, and cuts the roll paper at a specific position with the cutter mechanism as controlled by the control device controller 50 to produce a receipt.

The control device storage unit 52 has nonvolatile memory such as an EEPROM device, and stores data.

The control device storage unit 52 stores the installed control device-side POS application 521.

The control device storage unit 52 stores a control device-side product master database 522. The control device-side product master database 522 is a master database relationally storing the product code, product name, product price, and other product-related information for products that are sold in the store.

The control device storage unit 52 also stores a control device-side HTML file 523. The control device-side HTML file 523 is described further below.

The control device communication unit 53 accesses the local area network LN and communicates with other devices (such as a tablet terminal 13) connected to the network as controlled by the control device controller 50.

The control device communication unit 53 also accesses the global network GN through the communication device 14 and communicates with other devices (such as the communication device 15) connected to the network as controlled by the control device controller 50.

The control device-side device communication unit 54 has an interface board with a USB port, a port conforming to a non-USB serial communication standard, or ports conforming to other communication protocols. Devices can connect to each port. The control device-side device communication unit 54 communicates with devices connected to the recording control device 16 through the corresponding port as controlled by the control device controller 50.

Note that the control device-side device communication unit 54 may also be configured with a wireless communication capability and communicate with devices wirelessly.

A barcode scanner BS1, customer display CD1, cash drawer KS1, and monitor MT1 are devices connected to the recording control device 16.

The barcode scanner BS1 is used to read barcodes from products and product packaging, and outputs data representing the barcode to the control device-side device communication unit 54. The control device-side device communication unit 54 then outputs the data input from the barcode scanner BS1 to the control device controller 50.

The customer display CD1 displays text, symbols, and images as controlled by the control device controller 50. The information presented on the customer display CD1 can be read by the customer involved in the transaction at the checkout counter L.

The cash drawer KS1 has a tray for storing cash, and a mechanism for locking the tray, and unlocks and opens the tray as controlled by the control device controller 50.

The monitor MT1 has a display device such as an LCD panel or OLED panel, and displays images as controlled by the control device controller 50. The control device-side browser execution unit 501 of the control device controller 50 can display a web page on the monitor MT1.

The recording device 12 is a thermal line printer.

As shown in FIG. 2, the recording device 12 has a recording device controller 20, a recording device recording unit 21, a recording device storage unit 22, a recording device communication unit 23, and a recording device-side device communication unit 24.

The recording device controller 20 has a CPU, ROM, RAM, and other peripheral circuits not shown, and controls the recording device 12.

The recording device recording unit 21 includes mechanisms related to recording on roll paper, such as a conveyance mechanism for conveying roll paper stored inside the cabinet of the recording device 12, a recording mechanism for forming dots and recording images on the roll paper with a thermal head, and a cutter mechanism for cutting the roll paper at a specific position. The recording device recording unit 21 conveys the roll paper with the conveyance mechanism, records receipt-related images on the roll paper with the recording mechanism, and cuts the roll paper at a specific position with the cutter mechanism as controlled by the recording device controller 20 to produce a receipt.

The recording device storage unit 22 has nonvolatile memory such as an EEPROM device, and stores data.

The recording device communication unit 23 communicates with the tablet terminal 13 in a wireless LAN infrastructure mode as controlled by the recording device controller 20. Wireless communication between the recording device 12 and tablet terminal 13 is not limited to the foregoing, and may be by direct communication between devices in a wireless LAN ad hoc mode, or by direct communication between devices using a near-field communication protocol such as Bluetooth®.

The recording device-side device communication unit 24 communicates with devices connected to the recording device 12 as controlled by the recording device controller 20.

A barcode scanner BS2, customer display CD2, and cash drawer KS2 are devices connected to the recording device 12.

As shown in FIG. 2, the tablet terminal 13 has a terminal controller 30, a terminal communication unit 31, a touch panel 32, and a terminal storage unit 33.

The terminal controller 30 has a CPU, ROM, RAM, and other peripheral circuits not shown, and controls the tablet terminal 13.

A specific web browser is installed on the tablet terminal 13. The terminal controller 30 functions as a terminal-side browser execution unit 301 by reading and running the installed web browser.

The terminal communication unit 31 communicates with the recording device 12 in a wireless LAN infrastructure mode as controlled by the terminal controller 30.

The terminal communication unit 31 communicates through the communication device 14 and local area network LN with devices (including the communication device 15) connected to the global network GN as controlled by the terminal controller 30.

The touch panel 32 has a display device such as an LCD panel and a touch sensor disposed over the LCD panel. The display panel displays images as controlled by the terminal controller 30. The touch sensor detects touch operations and outputs to the terminal controller 30.

The terminal storage unit 33 has an EEPROM device or other type of nonvolatile memory, and stores data.

As shown in FIG. 2, the control server 15 has a server controller 40, a server storage unit 41, and a server communication unit 42.

The server controller 40 has a CPU, ROM, RAM, and other peripheral circuits not shown, and controls the control server 15.

Specific web server software is installed on the control server 15. The server controller 40 functions as a server-side server software execution unit 401 by reading and running the installed web server software.

A server-side POS application 411, which is a web application that runs under the web server software, is installed on the control server 15. The server-side server software execution unit 401 functions as a server-side application execution unit 4011 by reading and running the installed server-side POS application 411.

The functions of the function blocks in the server controller 40, and processes based on those functions, are described below.

The server storage unit 41 comprises nonvolatile memory such as a hard disk drive or EEPROM device, and stores data.

The server storage unit 41 stores the installed server-side POS application 411.

The server storage unit 41 also stores a server-side product master database 412. Like the control device-side product master database 522, the server-side product master database 412 relationally stores a product code, name, price, and other product-related information for products sold in the store.

The server storage unit 41 also stores a server-side HTML file 413. The server-side HTML file 413 is described below.

The server storage unit 41 stores a transaction information management database 414. The transaction information management database 414 is described further below.

The server communication unit 42 accesses the global network GN and communicates with devices to the network (such as the recording control device 16 and tablet terminal 13) as controlled by the server controller 40.

The operation of devices in the transaction processing system 1 when processing a transaction at the checkout counter L where a satellite POS terminal SP is installed is described next.

To process a transaction, the checkout clerk at the checkout counter L turns the tablet terminal 13 disposed to the checkout counter L on and starts the browser. The checkout clerk turns the tablet terminal 13 on and starts the browser at a specific time before starting a transaction at the checkout counter L, such as when the store opens each day.

When the browser starts, the terminal-side browser execution unit 301 of the terminal controller 30 of the tablet terminal 13 accesses a specific URL on the control server 15, and accesses the control server 15 by HTTP. When accessed by the tablet terminal 13, the server-side server software execution unit 401 of the server controller 40 of the control server 15 sends the server-side HTML file 413 corresponding to the accessed URL to the tablet terminal 13. The terminal-side browser execution unit 301 of the terminal controller 30 of the tablet terminal 13 thus acquires the server-side HTML file 413 transmitted by the control server 15.

A program with functions for communicating with the server-side application execution unit 4011 of the server controller 40 of the control server 15 and executing transaction-related processes is embedded in the server-side HTML file 413 in a specific scripting language. The functions of the terminal-side browser execution unit 301 of the terminal controller 30 of the tablet terminal 13 are embodied by programs written in a specific scripting language that runs on the browser, the web application of the control server 15.

The terminal-side browser execution unit 301 executes the acquired server-side HTML file 413, and displays a user interface for processing transactions 60 (FIG. 3) on the touch panel 32.

Figure 3:
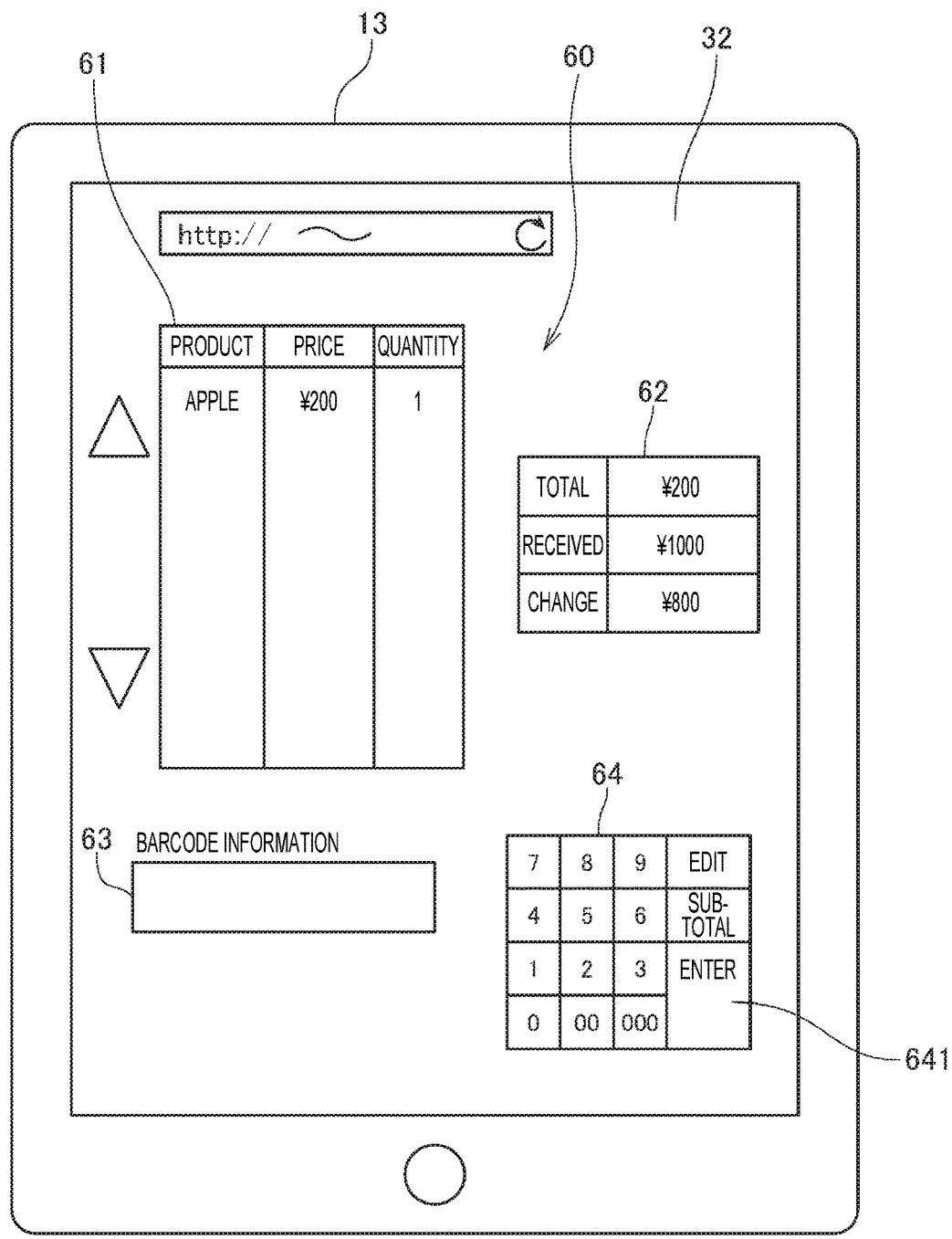
FIG. 3 shows an example of a user interface.

FIG. 3 shows an example of a user interface for processing transactions 60 that is displayed on the touch panel 32.

A list display area 61 where the names of the products (product names) being purchased by the customer, the prices of the products, and the quantities of the products are presented in a list is displayed at the top left of the user interface for processing transactions 60 in FIG. 3. To the right of this list display area 61 is presented an amount display area 62 where the total amount of the products being purchased by the customer, the amount of money received from the customer in the transaction, and the amount of change due to the customer are displayed.

Information (referred to below as barcode information) expressed by the barcodes that are read by the barcode scanner BS1, BS2 of the recording device 12 is displayed in the barcode information display area 63 below the list display area 61. The barcode information is basically the product code assigned to the product.

A virtual keypad 64 is displayed on the right side of the barcode information display area 63. The virtual keypad 64 includes an Enter key 641 for finalizing the transaction.

Figure 4:
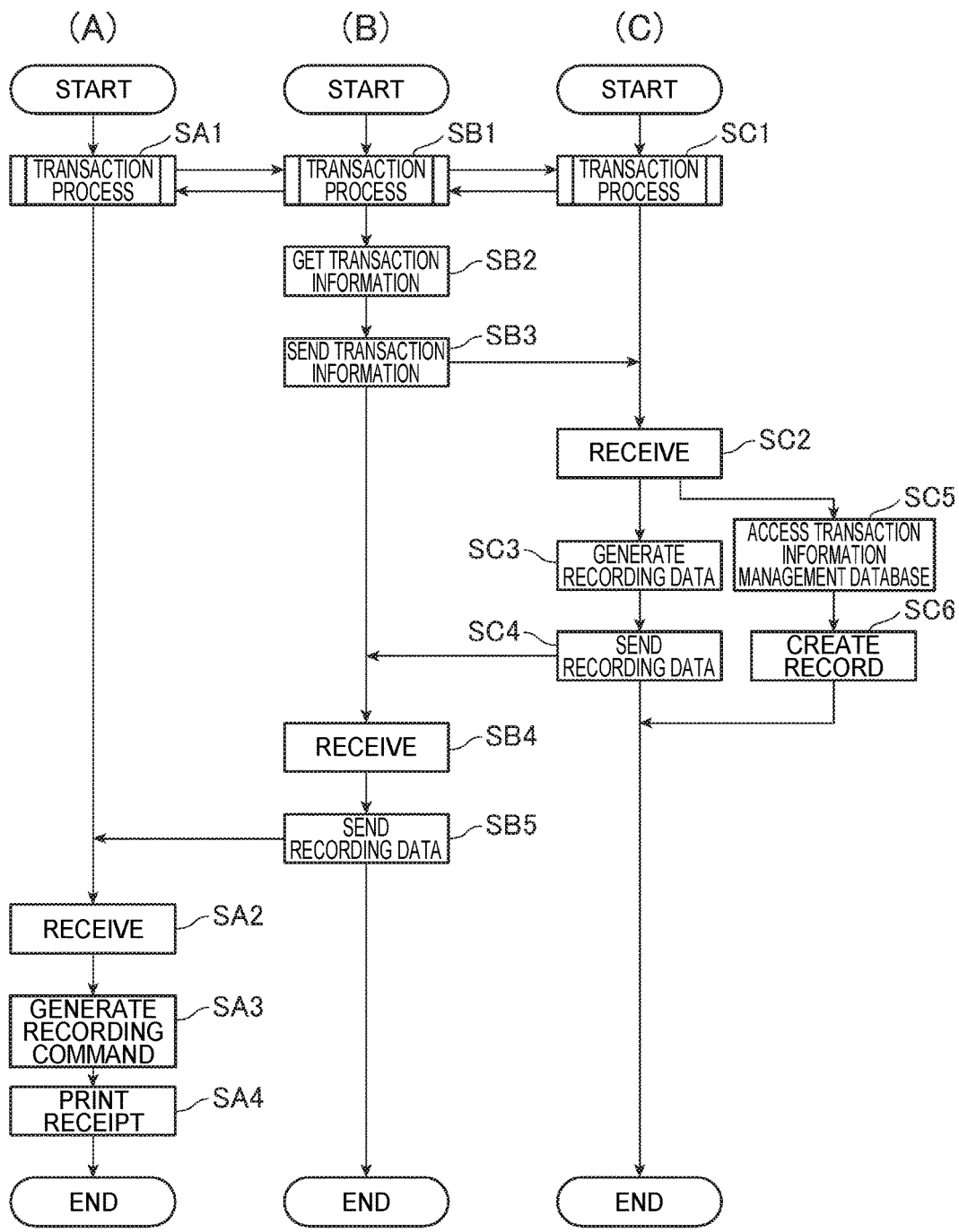
FIG. 4 is a flow chart showing the operation of devices in the transaction processing system.

FIG. 4 is a flow chart showing the operation of devices in the transaction processing system 1 during a transaction. Column (A) shows the operation of the recording device 12, (B) shows the operation of the tablet terminal 13, and (C) shows the operation of the control server 15.

As shown in FIGS. 4 (A), (B), and (C), the recording device 12, tablet terminal 13, and control server 15 execute a transaction process when a transaction starts (step SA1, step SB1, and step SC1).

Figure 5:
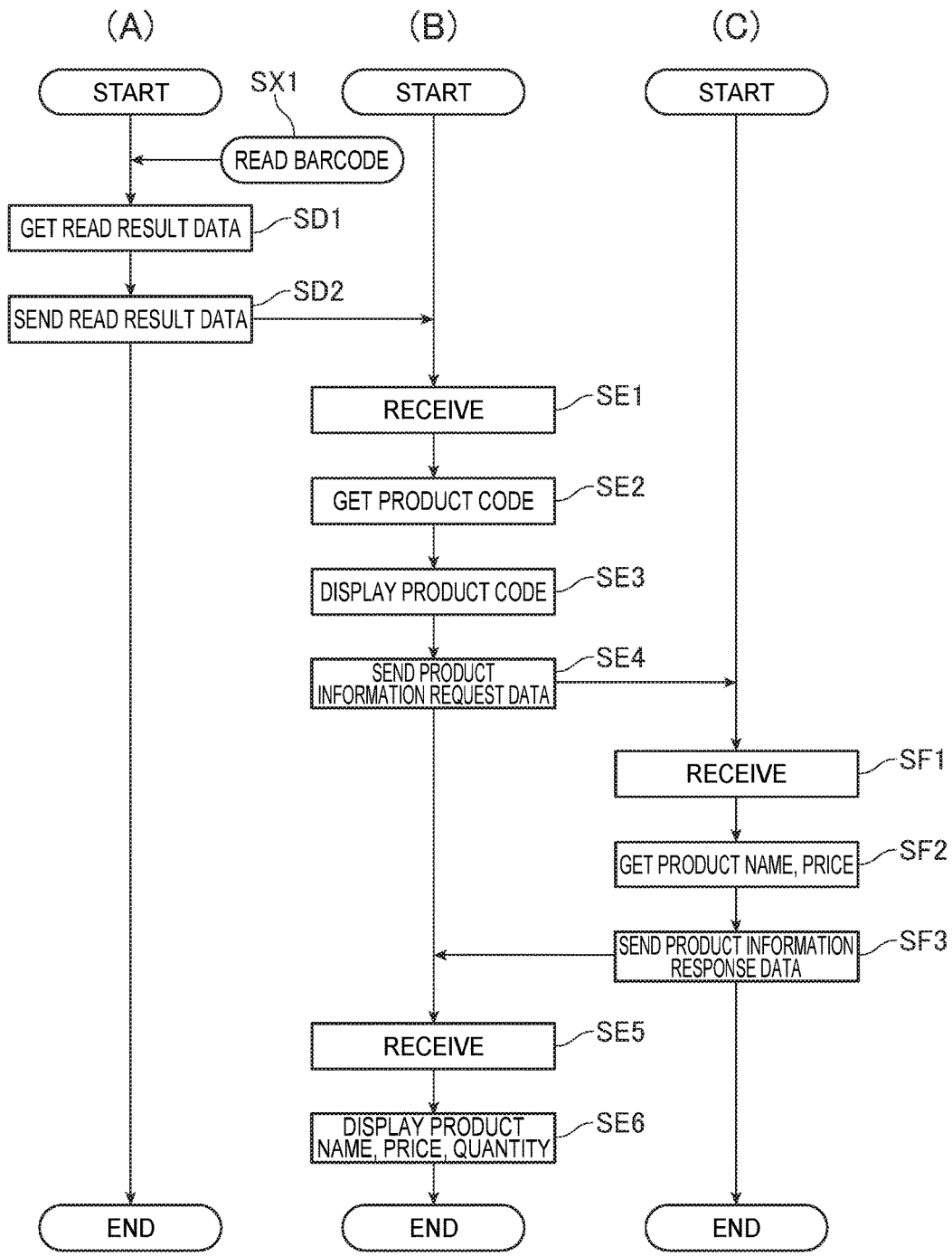
FIG. 5 is a flow chart showing the operation of devices in the transaction processing system.

FIG. 5 is a flow chart showing part of the process executed by the recording device 12, tablet terminal 13, and control server 15 in the transaction process. Column (A) shows the operation of the recording device 12, (B) shows the operation of the tablet terminal 13, and (C) shows the operation of the control server 15.

In the transaction process, the checkout clerk reads the barcode on the product or the packaging of the product being purchased by the customer with the barcode scanner BS2 (step SX1). Upon reading a barcode, the barcode scanner BS2 sends data based on the read result (referred to below as the "read result data") through the port to which the barcode scanner BS2 is connected to the recording device-side device communication unit 24 of the recording device 12. The recording device-side device communication unit 24 then outputs the read result data to the recording device controller 20.

The read result data is data including information indicating the product code of the product.

As shown in FIG. 5 (A), the recording device controller 20 of the recording device 12 acquires the read result data based on the input from the recording device-side device communication unit 24 (step SD1).

Next, the recording device controller 20 controls the recording device communication unit 23 to send the acquired read result data to the tablet terminal 13 (step SD2).

As shown in FIG. 5 (B), the terminal-side browser execution unit 301 of the terminal controller 30 of the tablet terminal 13 controls the terminal communication unit 31 to receive the read result data (step SE1).

Next, based on the read result data, the terminal-side browser execution unit 301 acquires the product code (step SE2).

Next, the terminal-side browser execution unit 301 displays the product code acquired in step SE2 in the barcode information display area 63 of the user interface for processing transactions 60 (step SE3).

Next, the terminal-side browser execution unit 301 controls the terminal communication unit 31 to send data (referred to below as product information request data) querying the product name and product price of the product identified by the product code acquired in step SE2 to the control server 15 (step SE4).

Note that the terminal-side browser execution unit 301 manages the information required to communicate with the control server 15, such as the address of the control server 15 and the corresponding protocol, opens a connection with the control server 15 based on the managed information, and communicates data through the opened connection.

As shown in FIG. 5 (C), the server-side application execution unit 4011 of the server controller 40 of the control server 15 controls the server communication unit 42 to receive the product information request data (step SF1).

Next, based on the received product information request data, the server-side application execution unit 4011 acquires the product code, references the server-side product master database 411 stored by the server storage unit 41, and acquires the name and the price of the product identified by the acquired product code (step SF2).

Next, the server-side application execution unit 4011 controls the server communication unit 42, and sends product information response data expressing the product name and price information acquired in step SF2 to the tablet terminal 13 (step SF3).

As shown in FIG. 5 (B), the terminal-side browser execution unit 301 of the terminal controller 30 of the tablet terminal 13 controls the terminal communication unit 31 to receive the product information response data (step SE5).

Next, the terminal-side browser execution unit 301 acquires the product name and product price information based on the received product information response data, and displays the name, price, and quantity of the product in the corresponding fields of the list display area 61 in the user interface for processing transactions 60 (step SE6).

As described above, during a transaction, the barcode of each product being purchased by the customer is read by the checkout clerk with the barcode scanner BS2, and the process shown in FIG. 5 is executed by the devices as each barcode is read.

When reading the barcode from every product and processing by each device based on the read barcode is completed, the name, price, and quantity of each product being purchased by the customer is displayed in the list display area 61.

When the barcode of every product has been read, the checkout clerk uses the virtual keypad 64 to confirm the transaction total, receives payment from the customer, and makes change as due. The terminal-side browser execution unit 301 of the terminal controller 30 of the tablet terminal 13 then appropriately displays the total of the products purchased by the customer, the amount received from the customer for the transaction, and the change due to the customer in the amount display area 62 of the user interface for processing transactions 60. The terminal-side browser execution unit 301 also communicates with the recording device controller 20 of the recording device 12 as needed to control the customer display CD2 and cash drawer KS2.

When change has been given to the customer, the checkout clerk operates the Enter key 641 of the virtual keypad 64 of the user interface for processing transactions 60. The transaction process ends when the checkout clerk operates the Enter key 641.

As shown in FIG. 4 (B), when the transaction process ends, terminal-side browser execution unit 301 of the terminal controller 30 of the tablet terminal 13 acquires the transaction information (step SB2).

The transaction information is information including: information denoting the combination of product code, name, price, and quantity for each product purchased by the customer (referred to below as the purchased product information); information denoting the total purchase amount, cash amount received from the customer, and change returned to the customer (referred to below as transaction amount information); information denoting the time of the transaction (referred to below as the transaction time information); and the store ID, which is identification information for the store (business) where the transaction was completed. Information identifying the tablet terminal 13 and information identifying the recording device 12 is also included in the transaction information.

Note that during a transaction, the terminal-side browser execution unit 301 stores information contained in the purchased product information and information contained in the transaction amount information to specific storage areas.

In step SB2, the terminal-side browser execution unit 301 acquires purchased product information and transaction amount information based on the information stored to the specific storage areas.

The time that the transaction was performed as indicated by the transaction time information is the time when the Enter key 641 was operated. The time that the transaction was performed as indicated by the transaction time information is not limited to the time that the Enter key 641 was operated, and may be any time derived from the transaction, such as the time when the barcode for the first product was read in the transaction.

After acquiring the transaction information, the terminal-side browser execution unit 301 controls the terminal communication unit 31 to send transaction information data indicating the acquired transaction information to the control server 15 (step SB3).

As shown in FIG. 4 (C), the server-side application execution unit 4011 of the server controller 40 of the control server 15 controls the server communication unit 42 to receive the transaction information data (step SC2).

Next, the server-side application execution unit 4011 generates recording data instructing producing a receipt in a specific layout based on the transaction information indicated by the received transaction information data (step SC3).

The recording data is control data specifying producing a receipt according to a specific layout, and including in this example a top logo, bottom logo, the time of the transaction, the name, price, quantity and total amount of the products purchased by the customer, the amount received from the customer, and the amount of change due to the customer. The recording data in this embodiment is an XML document of information written in a specific XML format.

Next, the server-side application execution unit 4011 controls the server communication unit 42 to send the generated recording data to the tablet terminal 13 (step SC4).

As shown in FIG. 4 (B), the terminal-side browser execution unit 301 of the terminal controller 30 of the tablet terminal 13 controls the terminal communication unit 31 to receive the recording data (step SB4).

Next, the terminal-side browser execution unit 301 controls the terminal communication unit 31 to send the received recording data to the recording device 12 (step SB5).

As shown in FIG. 4 (A), the recording device controller 20 of the recording device 12 controls the recording device communication unit 23 to receive the recording data (step SA2).

Next, the recording device controller 20 generates recording commands in the command language of the recording device recording unit 21 based on the recording data in the XML document (step SA3).

Next, the recording device controller 20 controls the recording device recording unit 21 to produce a receipt based on the generated recording commands (step SA4).

The receipt produced in step SA4 is then given by the checkout clerk to the customer.

As shown in FIG. 4 (C), after the transaction information data is received in step SC2, the server-side application execution unit 4011 of the server controller 40 of the control server 15 accesses the transaction information management database 414 stored by the server storage unit 41 (step SC5).

Each record in the transaction information management database 414 relationally stores the purchased product information, transaction amount information, transaction time information, and store ID.

Next, based on the transaction information data received in step SC2, a record relating the purchased product information, transaction amount information, transaction time information, and store ID is created in the transaction information management database 414 (step SC6).

The control server 15 thus cumulatively stores transaction information appropriate to the transaction. As a result, the control server 15 can manage sales by store and sales by individual product in each store, for example.

The process executed by the devices for a transaction performed at a checkout counter L where a satellite POS terminal SP is installed is described in FIG. 4 and FIG. 5.

When a transaction is performed at a checkout counter L where the main POS terminal MP is installed, the recording control device 16 alone executes the processes of the tablet terminal 13 and the recording device 12 described in FIG. 4 and FIG. 5.

More specifically, the control device-side browser execution unit 501 of the control device controller 50 of the recording control device 16 accesses the control server 15 and acquires the server-side HTML file 413 from the control server 15 before a transaction is processed. Thereafter, the function of the control device-side browser execution unit 501 is embodied by a program written in a specific scripting language that runs on the browser, and the server-side POS application 411 of the control server 15.

During a transaction, the control device-side browser execution unit 501 communicates with the control server 15 and executes the transaction process based on the read results of the barcode scanner BS1 connected to the control device-side browser execution unit 501. After the transaction process, the control device-side browser execution unit 501 acquires the transaction information, and sends the transaction information data based on the acquired transaction information to the control server 15. The control server 15 generates and sends to the recording control device 16 recording data for producing a receipt based on the transaction information data. The control device-side browser execution unit 501 of the recording control device 16 receives the recording data from the control server 15, generates recording commands based on the received recording data, and produces a receipt.

As described above, when able to communicate with the control server 15 through the global network GN, the tablet terminal 13 uses the server-side product master database 412 to control the recording device 12 through the server-side POS application 411 (web application) running on the control server 15.

However, the tablet terminal 13 and recording control device 16 of the transaction processing system 1 may not be able to communicate with the global network GN at times due to a communication error (such as congestion on the global network GN). Being unable to communicate includes being completely unable to communicate with the control server 15, there being communication delays exceeding a specific timeout period, and communication being unstable for longer than a specific period.

The tablet terminal 13 executes the process described below to handle such communication problems.

Figure 6:
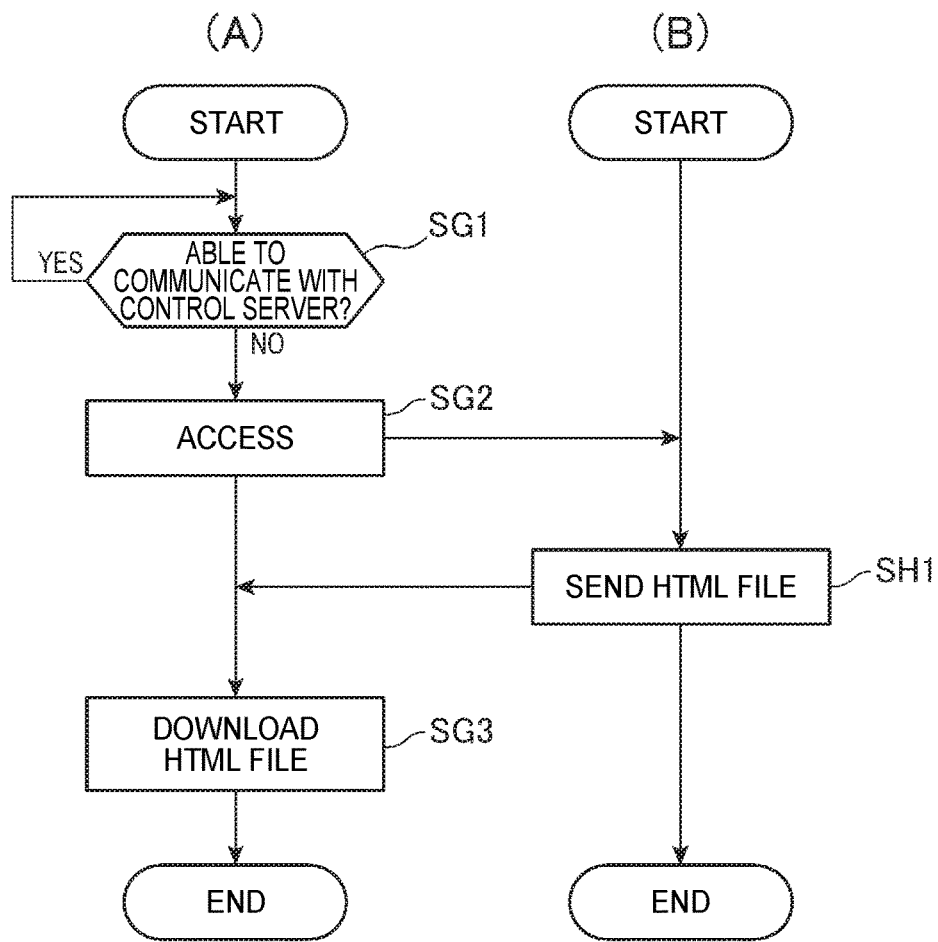
FIG. 6 is a flowchart showing the operation of a tablet terminal and a recording control device.

FIG. 6 is a flow chart showing the operation of the tablet terminal 13 and recording control device 16. FIG. 6 (A) shows the operation of the tablet terminal 13, and (B) shows the operation of the recording control device 16.

When the operation shown in the flow chart in FIG. 6 (A) starts, the tablet terminal 13 can communicate with the control server 15 through the global network GN, acquires the server-side HTML file 413 from the control server 15, and can communicate with the control server 15 and control the recording device 12 by means of the server-side HTML file 413.

When the operation shown in the flow chart in FIG. 6 (B) starts, the recording control device 16 is running.

As shown in FIG. 6 (A), the terminal-side browser execution unit 301 of the terminal controller 30 of the tablet terminal 13 monitors if communicate with the control server 15 is possible (step SG1).

Software with a function for intermittently querying the control server 15 for a response and monitoring whether or not communication with the control server 15 is possible based on the result of the request is installed on the tablet terminal 13. In step SG1, the terminal-side browser execution unit 301 determines if communication with the control server 15 is possible by a function of this software. The process used in step SG1 is not limited to the following example, and any appropriate method may be used.

If communication with the control server 15 is not possible (step SG1: NO), the terminal-side browser execution unit 301 accesses a specific URL of the recording control device 16 and accesses the recording control device 16 by HTTP (step SG2). The URL to access is previously registered and recorded in data the terminal-side browser execution unit 301 can reference.

As shown in FIG. 6 (B), when accessed by the tablet terminal 13, the control device-side server software execution unit 502 of the control device controller 50 of the recording control device 16 sends a specific control device-side HTML file 523 corresponding to the accessed URL to the tablet terminal 13 (step SH1).

As shown in FIG. 6 (A), the terminal-side browser execution unit 301 of the terminal controller 30 of the tablet terminal 13 thus acquires the control device-side HTML file 523 sent by the recording control device 16 (step SG3). A program with functions for executing transaction-related processes in cooperation with the control device-side application execution unit 5021 of the control device-side server software execution unit 502 of the control device controller 50 of the recording control device 16 is embedded in the control device-side HTML file 523 in a specific scripting language. Thereafter, the function of the terminal-side browser execution unit 301 of the terminal controller 30 of the tablet terminal 13 is embodied by a program written in a specific scripting language that runs on the browser, and the control device-side POS application 521 of the recording control device 16.

The control device-side server software execution unit 502 of the recording control device 16 functions as a server of which the tablet terminal 13 is a client, and the tablet terminal 13 executes transaction-related processes by communicating with the control device-side application execution unit 5021 of the control device-side server software execution unit 502. More specifically, in relation to the tablet terminal 13, the control device-side application execution unit 5021 of the control device-side server software execution unit 502 of the recording control device 16 executes the processes shown in FIG. 4 (C) and FIG. 5 (C).

In this event, the control device-side application execution unit 5021 executes processes based on the control device-side product master database 522 stored by the control device communication unit 52 in a process corresponding to step SF2 in FIG. 5. In the process corresponding to steps SC5 and SC6 in FIG. 4, the control device-side application execution unit 5021 of the recording control device 16 cumulatively stores the received transaction information as the transaction. When able to communicate with the control server 15 again, the recording control device 16 sends the stored transaction information to the control server 15. Based on the received transaction information, the control server 15 updates the transaction information management database 414. As a result, a record based on the transaction at the checkout counter L is created without fail in the transaction information management database 414.

When unable to communicate with the control server 15, the tablet terminal 13 thus accesses the recording control device 16 and acquires the control device-side HTML file 523 from the recording control device 16. The tablet terminal 13 then communicates with the recording control device 16 to execute processes by means of the acquired control device-side HTML file 523. As a result, business can continue as usual in the store even when unable to communicate with the control server 15.

The process executed by the tablet terminal 13 when unable to communicate with the control server 15 through the global network GN is described in FIG. 6.

When unable to communicate with the control server 15 through the global network GN, the recording control device 16 also executes the same process shown in FIG. 6.

More specifically, when the control device-side browser execution unit 501 of the control device controller 50 of the recording control device 16 detects it is unable to communicate with the control server 15, the control device-side browser execution unit 501 changes the connection from the control server 15 to the control device-side server software execution unit 502 of the recording control device 16, and accesses the control device-side server software execution unit 502.

When accessed from the control device-side browser execution unit 501, the control device-side server software execution unit 502 sends the control device-side HTML file 523 stored in the control device communication unit 52 to the control device-side browser execution unit 501 by inter-process communication.

The control device-side browser execution unit 501 thus acquires and executes the control device-side HTML file 523.

Thereafter, the control device-side server software execution unit 502 functions as a server of which the control device-side browser execution unit 501 is a client, and the control device-side browser execution unit 501 communicates with the control device-side application execution unit 5021 of the control device-side server software execution unit 502 to execute transaction-related processes. More specifically, the control device-side application execution unit 5021 of the control device-side server software execution unit 502, and the control device-side browser execution unit 501, work together to execute processes corresponding to FIG. 4 (C) and FIG. 5 (C). In this event, in the process corresponding to step SF2 in FIG. 5, the control device-side application execution unit 5021 executes a process based on the control device-side product master database 522 stored by the control device communication unit 52. In the process corresponding to steps SC5 and SC6 in FIG. 4, the control device-side application execution unit 5021 of the recording control device 16 cumulatively stores the received transaction information as the transaction. When able to communicate with the control server 15 again, the recording control device 16 sends the stored transaction information to the control server 15. Based on the received transaction information, the control server 15 updates the transaction information management database 414. As a result, a record based on the transaction at the checkout counter L is created without fail in the transaction information management database 414.

The synchronization processor 503 of the control device controller 50 of the recording control device 16 is described next.

Figure 7:
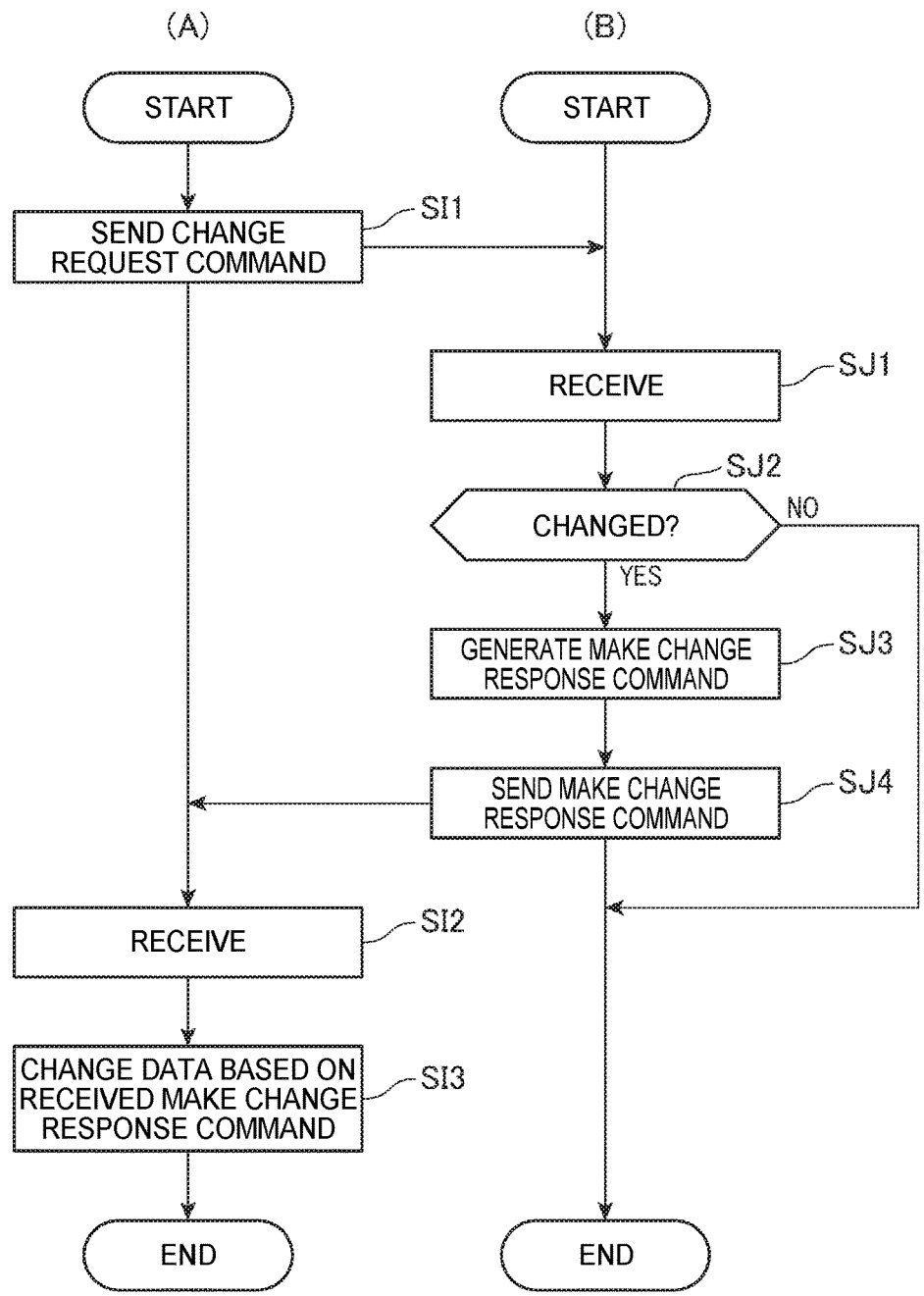
FIG. 7 is a flow chart showing the operation of the recording control device and control server.

FIG. 7 is a flow chart showing the operation of the recording control device 16 and control server 15 when the synchronization processor 503 executes the synchronization process. FIG. 7 (A) shows the operation of the recording control device 16, and (B) shows the operation of the control server 15.

The synchronization processor 503 synchronizes the server-side POS application 411 stored by the control server 15 with the control device-side POS application 521 stored by the recording control device 16; the server-side product master database 412 stored by the control server 15 with the control device-side product master database 522 stored by the recording control device 16; and the server-side HTML file 413 stored by the control server 15 with the control device-side HTML file 523 stored by the recording control device 16.

Note that the server-side POS application 411, server-side product master database 412, and server-side HTML file 413 stored by the control server 15 are referred to below as server-side data.

The control device-side POS application 521, control device-side product master database 522, and control device-side HTML file 523 stored by the recording control device 16 are referred to below as control device-side data.

By synchronizing the server-side data and control device-side data, the tablet terminal 13 can execute appropriate processes before and after the connection is switched from the control server 15 to the control device-side server software execution unit 502 of the recording control device 16, and the control device-side browser execution unit 501 can execute appropriate processes before and after the connection is switched from the control server 15 to the control device-side server software execution unit 502.

As shown in FIG. 7 (A), the synchronization processor 503 controls the control device communication unit 53 to send to the control server 15 a control command (referred to below as a "change request command") querying whether or not there is a change in the server-side data (step SI1). A change request command is a command containing the serial number of the recording control device 16. Note that the synchronization processor 503 manages communication-related information required to send a change request command, such as the address to access on the control server 15.

The synchronization processor 503 sends the change request command to the control server 15 at a specific interval. The process starting from step SI1 is therefore executed at the specific interval at which the change request command is transmitted.

As shown in FIG. 7 (B), the server-side server software execution unit 401 of the control server 15 controls the server communication unit 42 to receive the change request command (step SJ1).

Next, the server-side server software execution unit 401 determines if a change was made to the server-side data between when a change request command was last received from that recording control device 16 and when the change request command is received in step SJ1 (step SJ2).

If there was no change to the server-side data (step SJ2: NO), the server-side server software execution unit 401 ends the process.

If there was a change to the server-side data (step SJ2: YES), the server-side server software execution unit 401 generates a control command (referred to below as a "make change response command") to make the same change in the control device-side data that was made in the server-side data (step SJ3).

Next, the server-side server software execution unit 401 controls the server communication unit 42 to send the generated make change response command to the recording control device 16 (step SJ4).

As shown in FIG. 7 (A), the synchronization processor 503 of the recording control device 16 then controls the control device communication unit 53 to receive the make change response command (step SI2).

Next, the synchronization processor 503 changes the control device-side data (step SI3).

The server-side data and control device-side data are thus kept synchronized by a function of the synchronization processor 503.

As described above, when the tablet terminal 13 is unable to communicate with the control server 15, the tablet terminal 13 changes its connection from the control server 15 to the recording control device 16, and executes processes using data stored by the recording control device 16 (such as the control device-side POS application 521, control device-side product master database 522, control device-side HTML file 523). Therefore, if the recording control device 16 is not running when the tablet terminal 13 and control server 15 become unable to communicate, the tablet terminal 13 cannot execute processes using data stored by the recording control device 16, and business may be interrupted.

As a result, the transaction processing system 1 executes the process described below using either method H1 or method H2.

Method H1

Figure 8:
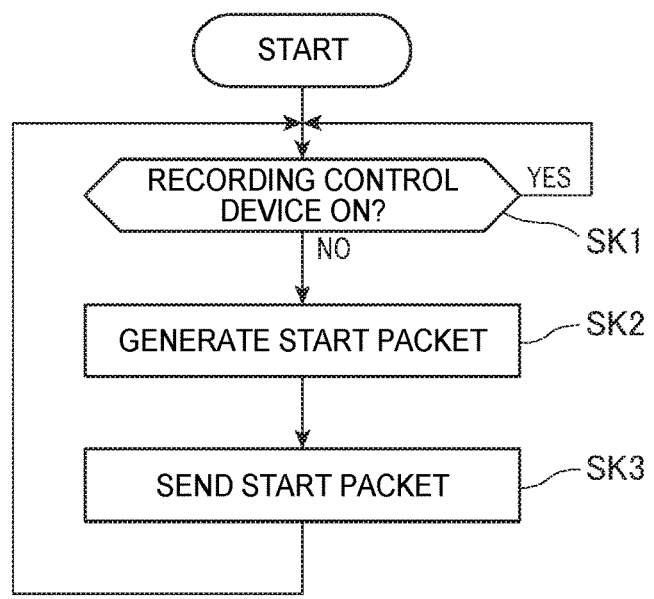
FIG. 8 is a flow chart showing the operation of the tablet terminal.

FIG. 8 is a flow chart showing the operation of the tablet terminal 13 when executing the process by method H1.

The tablet terminal 13 executes the process shown in the flow chart in FIG. 8 continuously after the browser starts.

As shown in FIG. 8, the terminal controller 30 of the tablet terminal 13 determines whether or not the recording control device 16 has started (step SK1).

In step SK1, the terminal controller 30 sends a response request command to the recording control device 16 at a specific interval. If there is no reply from the recording control device 16 to the response request command, the terminal controller 30 determines the recording control device 16 is not operating.

If the recording control device 16 is not operating (step SK1: NO), the terminal controller 30 generates a start command to start the recording control device 16 (step SK2). The start command is, for example, a Wake On LAN magic packet. In this event, if a Wake On LAN magic packet is received when the recording control device 16 is not on, a configuration enabling a network adapter to process and execute the magic packet is required. The start command may be any command that can start a recording control device 16 that has not started.

The terminal controller 30 then sends the generated start command to the recording control device 16 (step SK3).

The recording control device 16 starts in response to receiving the start command. As a result, the recording control device 16 turns on, and when the tablet terminal 13 is unable to communicate with the control server 15, the tablet terminal 13 can switch to the recording control device 16 and continue executing business processes.

Method H2

Figure 9:
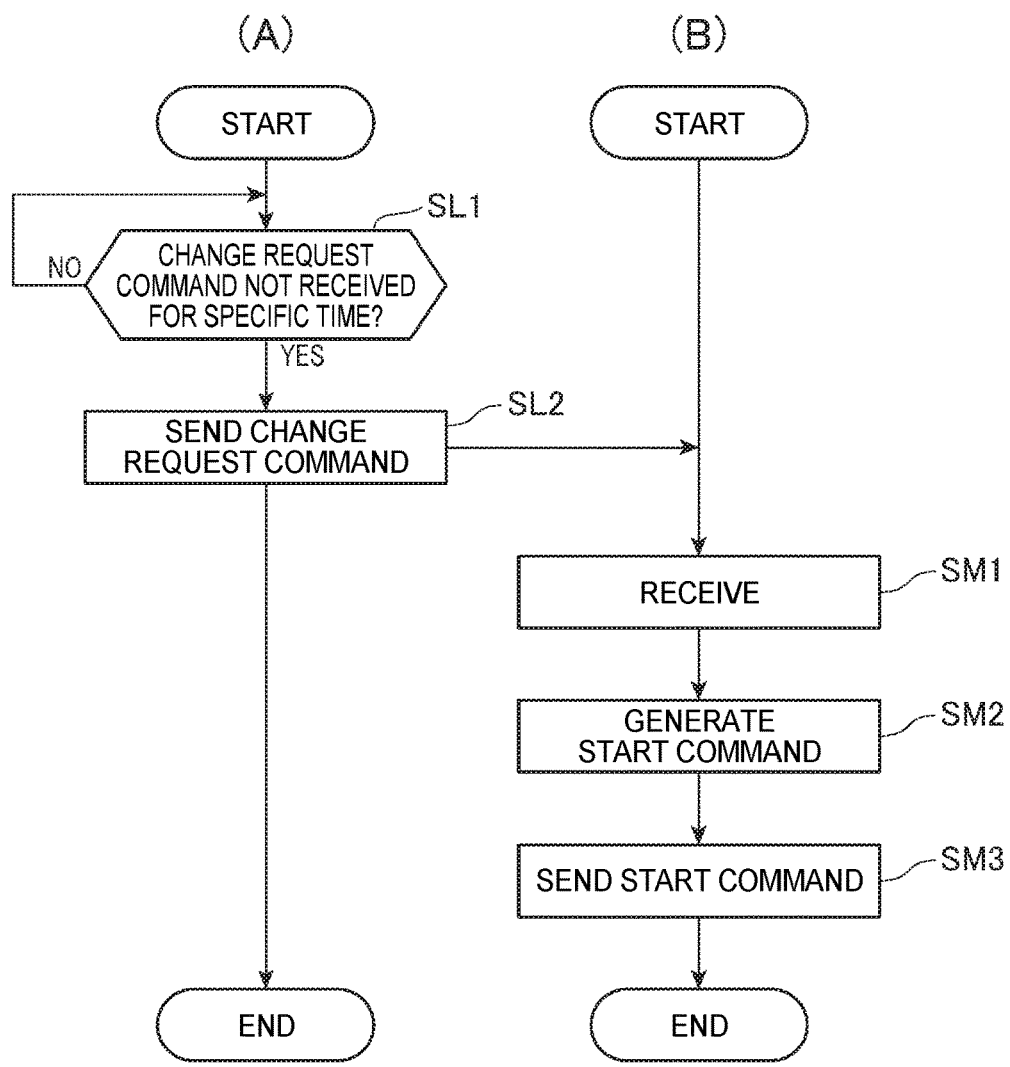
FIG. 9 is a flowchart showing the operation of the control server and tablet terminal.

FIG. 9 is a flow chart showing the operation of the control server 15 and the tablet terminal 13 when executing the process by method H2. FIG. 9 (A) shows the operation of the control server 15, and (B) shows the operation of the tablet terminal 13.

While executing the flow chart in FIG. 9, the control server 15 and tablet terminal 13 are able to communicate through the global network GN.

As shown in FIG. 9 (A), the server-side server software execution unit 401 of the server controller 40 of the control server 15 monitors if a change request command is not been received from the recording control device 16 for a specific time or more (step SL1).

The recording control device 16 regularly sends a change request command at a specific interval to the control server 15. If able to communicate through the global network GN but a change request command is not received from the control server 15, the recording control device 16 may not be on.

In step SL1, if a change request command is not received for a specific time adding a specific margin to the interval at which the recording control device 16 sends the change request command, the server-side server software execution unit 401 determines a change request command has not been received from the recording control device 16 for a specific time.

If a change request command is not received from the recording control device 16 for the specific time (step SL1: YES), the server-side server software execution unit 401 generates and sends a transmission request command requesting the tablet terminal 13 to send a start command to the recording control device 16 (step SL2).

As shown in FIG. 9 (B), the terminal-side browser execution unit 301 of the tablet terminal 13 receives the transmission request command (step SM1).

Next, the terminal-side browser execution unit 301 generates a start command based on the received transmission request command (step SM2).

Next, the terminal-side browser execution unit 301 sends the generated start command to the recording control device 16 (step SM3).

The recording control device 16 then starts in response to receiving the start command. As a result, the recording control device 16 turns on, and when unable to communicate with the control server 15, the tablet terminal 13 changes the connection to the recording control device 16 and can continue executing business processes.

Processing is efficient with method H2 because the recording control device 16 can be made to start by the control server 15 receiving a change request command sent regularly from the recording control device 16.

As described above, a transaction processing system 1 (network system) according to this embodiment includes a control server 15 (server) that connects to a global network GN, a tablet terminal 13 (terminal) that communicates with the control server 15 through the global network GN, and a recording control device 16 (control device) that communicates with the tablet terminal 13 through a local area network LN.

When able to communicate with the control server 15, the tablet terminal 13 communicates with the control server 15 and executes processes using server-side data stored by the control server 15; when unable to communicate with the control server 15, the tablet terminal 13 communicates with the recording control device 16 and executes processes using control device-side data stored by the recording control device 16; and when the recording control device 16 is not operating, the tablet terminal 13 sends a start command to the recording control device 16 to start the recording control device 16.

Thus comprised, when the recording control device 16 is not on, the tablet terminal 13 starts the recording control device 16, and enables communicating with the recording control device 16 to execute processes even when the tablet terminal 13 is unable to communicate with the control server 15. More specifically, a system in which a tablet terminal 13 and a control server 15 communicate through a network, and the tablet terminal 13 executes processes using data stored by the control server 15, can execute a process for handling situations in which the tablet terminal 13 is unable to communicate with the control server 15.

In method H1 in this embodiment of the disclosure, the tablet terminal 13 sends a response request command at a specific interval to the recording control device 16, determines whether or not the recording control device 16 is on based on whether or not a response to the request is received, and sends a start command to the recording control device 16 if it determines the recording control device 16 is not running.

Thus comprised, after appropriately determining if the recording control device 16 is running, the tablet terminal 13 can cause the recording control device 16 to start if it is not operating.

In this embodiment of the disclosure the recording control device 16 also sends to the control server 15 through the global network GN at a specific interval a change request command asking if the server-side data stored by the control server 15 has changed, and based on the response to the a change request command, executes a process synchronizing the control device-side data stored by the recording control device 16 with the server-side data stored by the control server 15.

Thus comprised, because the control device-side data and the server-side data can be synchronized, the tablet terminal 13 can execute processes appropriately to whether the tablet terminal 13 is connected to the control server 15 or the recording control device 16.

If a change request command from the recording control device 16 is not received for a specific time or more, the control server 15 in this embodiment of the disclosure communicates with the tablet terminal 13 and causes the tablet terminal 13 to send a start command to the recording control device 16.

Thus comprised, the control server 15 can detect when the recording control device 16 is not on based on whether or not a change request command from the recording control device 16 is received at the specific interval, and based thereon can cause the tablet terminal 13 to start the recording control device 16.

The tablet terminal 13 in this embodiment of the disclosure is also connected to a recording device 12 that can record on roll paper (recording medium), and controls the recording device 12 to record on the roll paper using server-side data or control device-side data.

Thus comprised, a system in which a tablet terminal 13 and a control server 15 communicate through a network, and the tablet terminal 13 executes a process causing the recording device 12 to record data stored by the control server 15, can execute a process for handling situations in which the tablet terminal 13 is unable to communicate with the control server 15.

Note that the terminal corresponding to the tablet terminal 13 may be a configuration having the ability to record on a recording medium.

The disclosure is described above with reference to a preferred embodiment thereof, but the disclosure is not limited thereto and can be modified and adapted in many ways without departing from the scope of the accompanying claims.

For example, the embodiment described above describes a configuration in which the control server 15 generates the recording data. However, a configuration in which the terminal-side browser execution unit 301 of the terminal controller 30 of the tablet terminal 13, or the control device-side browser execution unit 501 of the control device controller 50 of the recording control device 16, generates recording data is also conceivable.

The function blocks described above can also be desirably embodied by combinations of hardware and software, and do not suggest a specific hardware configuration.

The disclosure being thus described, it will be obvious that it may be varied in many ways. Such variations are not to be regarded as a departure from the spirit and scope of the disclosure, and all such modifications as would be obvious to one skilled in the art are intended to be included within the scope of the following claims.

What is claimed is:

1. A network system comprising:
a server;
a terminal configured to communicate with the server through a global network; and
a printer configured to communicate with the terminal through a local area network;
wherein the terminal is further configured to:
communicate with the server as a server and execute a process as a client using server-side data stored by the server when able to communicate with the server,
communicate with the printer as a server and execute a process as a client using printer-side data stored by the printer when unable to communicate with the server, and
send a magic packet to the printer, the magic packet configured to be processed and executed by a network adaptor when the printer is not in a started state,
and wherein the printer is configured to intermittently send to the server through the global network a change request command querying if there was a change in the server-side data stored by the server, and based on the response to the change request command, retrieve the server-side data from the server and execute a process to update the printer-side data stored by the printer with the server-side data.

2. The network system described in claim 1, wherein:
the terminal is configured to intermittently send a response request command to the printer,
determine if the printer is in the started state based on the result of a response to the response request command, and
send the magic packet to the printer if the printer is not in the started state.

3. The network system described in claim 1, wherein the server is configured such that:
when the change request command is not received from the printer for a specific time or more, the server communicates with the terminal and causes the terminal to send the magic packet to the printer.

4. The network system described in claim 1, wherein:
the terminal is connected to a recording device configured to record on a recording medium, and the terminal is configured to cause the recording device to record on the recording medium using the server-side data or the printer-side data.

5. The network system described in claim 4, wherein:
the recording device is connected to an input/output device configured to input/output data related to a transaction process, and to exchange data related to the transaction process with the terminal; and
the terminal is configured to execute a transaction process using the received transaction-related data and either the server-side data or printer-side data, and to cause the recording device to produce a receipt based on the transaction process.

6. The network system described in claim 1, wherein:
the printer comprises a recording unit configured to record on a recording medium, and the printer is configured to cause the recording unit to record on the recording medium using the server-side data or the printer-side data.

7. The network system described in claim 4, wherein:
the printer is connected to an input/output device configured to input/output data related to a transaction process, and to exchange data related to the transaction process with the terminal, and
the printer is configured to execute a transaction process using the received transaction-related data and either the server-side data or printer-side data, and to produce a receipt based on the transaction process with the recording unit.

8. The network system described in claim 1, wherein:
the terminal is configured to record on a recording medium, and to record on the recording medium using the server-side data or the printer-side data.

9. The network system described in claim 8, wherein:
the terminal is configured to execute a transaction process using the server-side data or the printer-side data, and to produce a receipt based on the transaction process.

10. A control method of a network system including a server, a terminal configured to communicate with the server through a global network, and a printer configured to communicate with the terminal through a local area network, the control method comprising steps of:
the terminal communicating with the server as a server and executing a process as a client using server-side data stored by the server when able to communicate with the server,
communicating with the printer as a server and executing a process as a client using printer-side data stored by the printer when unable to communicate with the server, and
sending a magic packet to the printer, the magic packet configured to be processed and executed by a network adaptor when the printer is not in a started state,
and the printer sending to the server through the global network a change request command querying if there was a change in the server-side data stored by the server, and based on the response to the change request command, retrieving the server-side data from the server and executing a process to update the printer-side data stored by the printer with the server-side data.

11. A terminal configured to communicate with a server through a global network and communicate with a printer through a local area network, wherein the terminal comprises a processor and memory storing non-transitory processor-executable instructions that, when executed by the processor, cause the processor to:

communicate with the server as a server and execute a process as a client using server-side data stored by the server when able to communicate with the server;

communicate with the printer as a server and execute a process as a client using printer-side data stored by the printer when unable to communicate with the server, wherein the printer retrieves the server-side data and updates the printer-side data using the server-side data retrieved from the server based on a response to a change request command querying if there was a change in the server-side data, the change request command intermittently sent to the server through the global network; and send a magic packet to the printer, the magic packet configured to be processed and executed by a network adaptor when the printer is not in a started state.

12. The terminal described in claim 11, wherein the instructions, when executed by the processor, further cause the processor to:

intermittently send a response request command to the printer;

determine if the printer is in the started state based on the result of a response to the response request command; and send the magic packet to the printer if the printer is not in the started state.

13. The terminal described in claim 12, wherein:

the terminal is connected to a recording device configured to record on a recording medium, and the instructions, when executed by the processor, further cause the processor to cause the recording device to record on the recording medium using the server-side data or the printer-side data.

14. The terminal described in claim 13, wherein the instructions, when executed by the processor, further cause the processor to:

exchange data related to the transaction process with an input/output device that is connected to the recording device and is configured to input/output data related to a transaction process; and execute a transaction process using the received transaction-related data and either the server-side data or printer-side data, and cause the recording device to produce a receipt based on the transaction process.

15. The terminal described in claim 12, wherein:

the terminal is configured to record on a recording medium using the server-side data or the printer-side data.

16. The terminal described in claim 13, wherein the instructions, when executed by the processor, further cause the processor to:

execute a transaction process using the server-side data or the printer-side data, and produce a receipt based on the transaction process.

17. The system of claim 1, wherein the printer-side data comprises at least one of: a POS application, a product database, and an HTML file.

18. The system of claim 17, wherein the printer-side data comprises the product database.

19. The system of claim 18, wherein the product database relationally stores two or more of a product code, a product name, and a product price.

* * * * *